(12) United States Patent
Seligmann (10) Patent No.: US 6,330,022 B1
(45) Date of Patent: Dec. 11, 2001

(54) DIGITAL PROCESSING APPARATUS AND METHOD TO SUPPORT VIDEO CONFERENCING IN VARIABLE CONTEXTS

(75) Inventor: Doree Seligmann, New York, NY (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/186,181

(22) Filed: Nov. 5, 1998

(51) Int. Cl.[7] ........................................... H04N 7/14
(52) U.S. Cl. ............................. 348/14.08; 348/14.09; 348/14.12
(58) Field of Search ................. 348/14, 15; 345/330, 345/331, 327, 302; 709/204; 370/260, 261; H04N 7/14, 7/15

(56) References Cited

U.S. PATENT DOCUMENTS

| | | |
|---|---|---|
| 4,400,724 | 8/1983 | Fields . |
| 5,003,532 | 3/1991 | Ashida et al. . |
| 5,185,667 * | 2/1993 | Zimmermann ........................ 358/209 |
| 5,257,306 | 10/1993 | Watanabe . |
| 5,323,445 | 6/1994 | Nakatsuka . |
| 5,335,011 | 8/1994 | Addeo et al. . |
| 5,347,306 | 9/1994 | Nitta . |
| 5,365,265 | 11/1994 | Shibata et al. . |
| 5,384,588 | 1/1995 | Martin et al. . |
| 5,453,780 | 9/1995 | Chen et al. . |
| 5,627,978 * | 5/1997 | Altom et al. ........................... 345/330 |
| 5,677,728 * | 10/1997 | Schoolman ............................. 348/14 |
| 5,914,728 * | 6/1999 | Yamagishi et al. ................... 345/507 |
| 5,953,050 * | 9/1999 | Kamata et al. ..................... 379/93.21 |
| 5,999,208 * | 12/1999 | McNerney et al. ..................... 348/15 |

FOREIGN PATENT DOCUMENTS

| | | | |
|---|---|---|---|
| 407038865A * | 2/1995 | (JP) | ................................. H04N/7/15 |
| 410056626A * | 2/1998 | (JP) | ................................. H04N/7/15 |
| 02000032446A * | 11/2000 | (JP) | ................................. H04N/7/15 |

* cited by examiner

Primary Examiner—Curtis Kuntz
Assistant Examiner—Melur Ramakrishnaiah (57) ABSTRACT

Video processing apparatus for supporting a video conference includes a processor/server, a conference bridge and a network of terminals, each terminal equipped with at least a video camera, display and a user input device such as a mouse. A user may select a conference context including a conference location, type (setting) and purpose that may be different from the selection of another conferee. The user may select a conference location and type, view a conference according to a default selection or design their own location and type in advance of the conference. The user also may select personal requirements and signal the need for various resources prior to and in real time during a conference. At the conference bridge, each conferee that joins a video conference is assigned a position at a conference setting of their selected context, for example, a round table or U shaped table generated as a video graphic. At each terminal, a signal is either received or generated for display such that each conference participant is able to view all other participant conferees according to the assigned position arrangement within the context selected by the conferee. An algorithm is described for generating such a signal for display. An audio signal can also be generated according to the assigned positions of the conferees that can be heard on 3D or stereo speakers in such a way as to relate to the assigned positions around the virtual conference setting. Moreover, as conferees join or leave the conference, the virtual setting may increase in size to accommodate the new conferees.

32 Claims, 6 Drawing Sheets

FIG. 6A
CONTEXT TABLE

| LOCATION | TYPE | PURPOSE |
|---|---|---|
| WHITE HOUSE OVAL OFFICE | ROUND | |
| ROOM 1135c | SQUARE | |
| AS IS | U-SHAPE | |
| ⋮ | ⋮ | |

FIG. 6B
CONTENSE TABLE

| NAME | ADDRESS/ VALID ID | VIEW/HEAR | MEDIA REQUIREMENT | FEATURES | REPRESENTATION | ... |
|---|---|---|---|---|---|---|
| DON | 908-483-2160 | YES/YES | POWER POINT PHOTO; HDTV | VBR, NET MEETING | | |
| ⋮ | | | | | | |

FIG. 7A

Events from "switch/bridge" to server:
New Call/Context (like MMCX)
→ create new context-assign a location and type-create context protocol
  → signal browsers New-Person
  → compute context object for person
  → signal browsers Remove-Person; Enter-Person:Leave-Person
→ signal browsers
→

FIG. 7B

Event from server to "switch/bridge"
→ notify of location/angle of sound sources
→ notify of video requirements

FIG. 7C

Events from server to browser:
New-Context/Call (of type t at location l)
→ create visual of virtual place with context object(s) and protocol New-Person (at context object)
  → create visual for context object if needed
  → create visual of person and assign it to context object
      → context object adjusts to accommodate person object
      → person object places itself at context object
      → create visual of person and assign it to context object Remove-Person (at context object)
  → remove visual of person
      → context object automatically reconfigures → Leave-Person (at context object) signal server of person object's "head" position and angle → person object adopts "absent" visual
  → context object keeps placeholder for personobject Enter-Person
→ person object adopts "present" visual
→ context object adjust to accommodate person object

FIG. 7D

Events In Browser Signal Srever:
Person Object Placed:
→ signal server of person object's "head" position and angle
→ compute resolution (based on transformation matrix and number of pixels required)
  → signal server of new video resolution requirements--similar to Level-Of-Detail View parameters change:
→ signal server of "head" position and angle
→ for every person object with video source:
  → signal server of person object's "head" position and angle
  → compute resolution (based on transformation matrix and number of pixels required);
    → signal server of new video resolution requirements--similar to Level-Of-Detail Freeze video (person)
→ store last frame
→ signal server to stop video transmission

DIGITAL PROCESSING APPARATUS AND METHOD TO SUPPORT VIDEO CONFERENCING IN VARIABLE CONTEXTS

I. BACKGROUND OF THE INVENTION

1. Technical Field

The present invention relates to the field of video conferencing and, more particularly, to apparatus and a method for providing a simulated video conferencing environment including live video conferees in variable conference contexts and controlling the conference during events such as 1) conferee removal, 2) temporary conferee departures or additions, and 3) changes in conferee requirements.

2. Description of the Related Arts

There has developed a need in the telecommunications art to provide simulated/live and real time video conferencing so that conferees may a) select a virtual conference context, b) communicate among themselves within the selected context, and c) share multimedia resources and tasks dynamically during a "virtual" meeting. By "conference context," it is meant a user's selection of a default or personal conference location, type (setting), purpose and other conference environmental factors of a virtual conference setting. As represented by Shibata et al., U.S. Pat. Nos. 5,365,265 and 5,604,738, in the video conferencing arts, a "chairperson" is typically designated to control the virtual meeting room and participation of conferees. Thus the context is typically selected and controlled by the chairperson. There is no flexibility in the choice of context by the conferees since the chairperson selects the context.

Also, as certain events occur, for example, conferees join, temporarily withdraw or permanently leave a conference, there is needed a way of signaling the characteristics of a particular conferee and what their individual needs and capabilities are. Otherwise, the conferee would have no ability to signal their personal conference preferences, and the resources needed by the conferee to partake in the conference may not be made available. The conference would not be as efficient if all conferee requirements pass through a chairperson for approval.

One proposal for providing a multimedia video conference is a services creation and execution environment called MR, for Meeting Room. MR is supported by "Archways" a distributed computer program that manages conferee, computer and network-based resources to support multimedia communication sessions among users, especially, within the context of long-term collaborations. Consequently, MR is especially useful within local area networks or private data networks but has not yet been extended to Internet, intranet and public switched telecommunications network applications.

Three dimensional graphics are used to provide conferees with simulated conference table settings. Three dimensional sound systems enable conferees to hear, for example, conferees virtually seated to their right through the right stereo channel signal and virtually seated to their left through the left stereo channel signal. Full body photographs of each conferee are image processed to provide graphically enhanced taking heads and bodies. By "graphically enhanced," it is meant the graphically drawn or painted and animated image portions such as the moving mouth.

United States Patents and articles describing MR, Archways and languages and interfaces for use in these and similar systems include: U.S. Pat. Nos. 5,471,318 and 5,689,553; Ahuja et al., "Archways: Making Remote Multimedia Conversations Persistent and Natural," *Proceedings of Technology Summit Telecom '95*, Oct. 2–7, 1995; Seligman, "Interactive Intent-Based Illustrations: A Visual Language for 3D Worlds," Ph.D. Thesis, Dept. of Computer Science, Columbia University, 1993 and Seligmann et al., "Providing Assurances in a Multimedia Interactive Environment," *Proceedings of ACM SIGCHI '95 Human Factors in Computing Systems*, Denver, Colo., May 7–11, 1995. The status of the use of 3D graphics enhancement of multimedia communication is also described by "Automatically Generated 3D Virtual Environments for Multimedia Communication," Fifth International Conference in Central Europe on Computer Graphical and visualization '97, Plzen, Czech Republic, Feb. 10–14, 1997.

In their '553 patent, Ahuja et al. describe calling party control of a conference including the naming of a room and conferee control of the saving of predetermined portions of a meeting. Meetings may be terminated and restarted, and user files may be stored. Also, a network blackboard feature may be provided which is a virtual space for conferees to make certain data, video or other entries that can be observed by the other conferees. The network blackboard is selectable from a menu of options provided a conferee on conference initiation. But there appears to exist no individual party control of the conference room, nor may an individual party signal their needs for additional resources or for changes to the conference context during a conference. Also, there is little disclosure of how the virtual meeting room functions in response to certain events such as the addition or removal of a conferee.

Other recently issued patents describing video conferencing apparatus and methods include U.S. Pat. Nos. 5,003,532; 5,323,445; 5,335,011; 5,347,306; 5,453,780; 5,491,743; 5,638,114 and 5,675,374.

Use of simulated talking heads derived from photographs is not as desirable as providing real-time, live images of the conferee. These can be provided by a camera associated with a personal computer and overlaid on a computer graphics generated background, such as a conference room setting. Also, it is known from U.S. Pat. Nos. 5,185,667; 5,384,588 and their progeny to capture a 180 degree image with a fish eye lens. The captured image may be a view of a conference room such as a jury room, conference room, office setting or other view. A user may pan, tilt, rotate and zoom within a 180 degree image of a conference including such a 180 degree view in real time from their input device.

SUMMARY OF THE INVENTION

Consequently, I have recognized that there is a need in the art to provide a conference bridge and methodology for providing a real-time live image of a conferee in a simulated 3-D graphically or photographically derived conference arrangement.

Moreover, I have also recognized that there is a need in the art to permit control of video conferencing by participants in the conference or from a central control perspective upon the occurrence of certain events. The conferees should not be limited to a selected, controlled virtual conference context but should be free to change conference parameters and presentations to them. For example, conference participants may choose to not be seen or heard, to join, temporarily leave or permanently depart from the conference, to have other participants to listen to an audio presentation or to view a visual or audiovisual presentation or other event that may be anticipated by a participant to happen as the conference proceeds. Conference participants should be able to selectively choose certain portions or all of a conference for participation or recording. During a conference, bandwidth requirements for delivery may expand and contract depending on the status of the conference at a given point in time and the virtual conference should adapt accordingly.

According to the present invention, video conferencing provides a real-time live image of conferees of a video conference within a conferee selected conference context. In one embodiment of the invention, video conferencing apparatus includes a video processor for 1) receiving a video signal representing an image of each conferee, 2) receiving conference context selection input representing the selection of a preferred location and conference type, and 3) assigning to each conferee a position at a virtual conference including images of the conferees within the selected conference location such that a conferee may see all other conferees, but not their own image, within their personally selected context. The apparatus outputs a video signal such that when the signal is displayed, a viewer will see images for all conferees according to the assigned positions within their selected conference context. In addition and in accordance with prior art processes, 3D sound may be provided for the simulated conference of live conferee images, resources may be shared and displayed and conference tools controlled via pop-up interactive windows.

DETAILED DESCRIPTION

Figure 1:
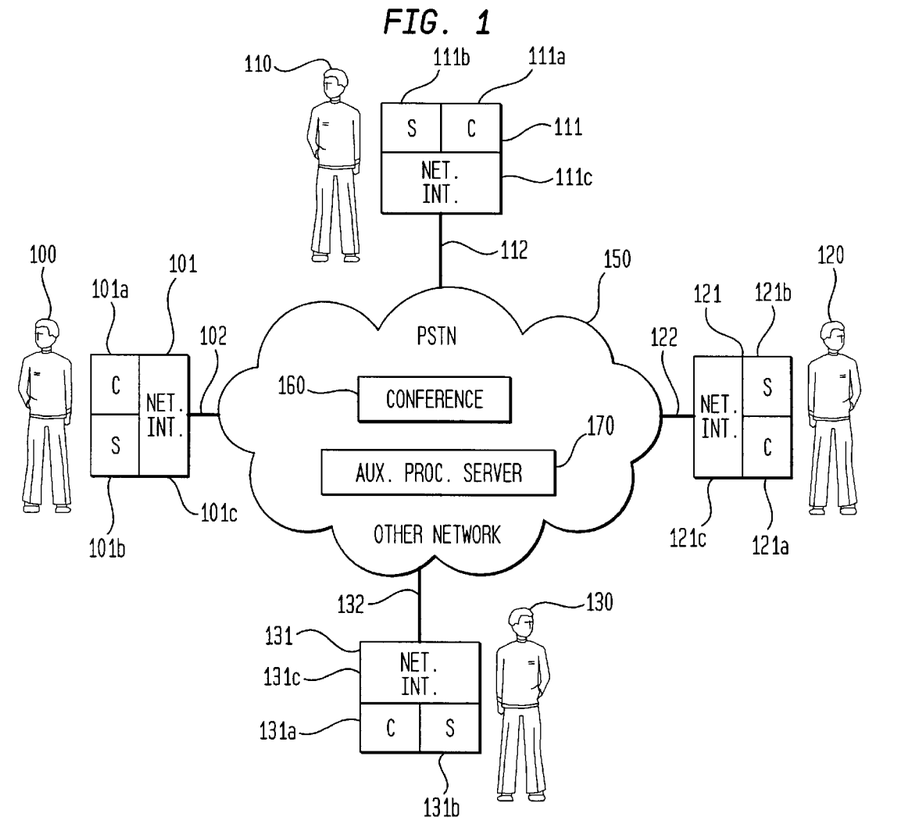
FIG. 1 provides an overall block diagram of apparatus of the present invention including a central conference bridge and individual conferee terminal apparatus.

Referring to FIG. 1, there is shown a schematic block diagram of a video conferencing arrangement according to the present invention. To the left is found a first conference participant or conferee 100 of a video conference. Each participant in a conference according to the present invention is connected via a local area network, wide area network, public switched telecommunications network, private data network, Internet, intranet or other network 150 to a conference bridge 160 and processor/server 170 of the present invention. Conference bridge 160 is called into play by processor/server 170. Conference bridge 160 is further described, by way of example, in FIG. 4 and its attendant description. Auxiliary processor/server 170 is a processor known in the art.

Auxiliary processor/server 170 may be a 3B processor associated with a switching center of a long distance carrier or a server/router known in the Internet arts, for example, one manufactured by Cisco Systems. In particular, it is known in the public switched telecommunications network to provide adjunct processors to toll or local offices which include switching functionality for the provision of special features such as conferencing, international long distance dialing and call forwarding features. Also, the functionality of a processor 170 as described herein may be incorporated within a toll or local switch such as a #4ESS or #5ESS electronic switch manufactured by Lucent Technologies, Inc. or other switch of another manufacturer.

Figure 5:
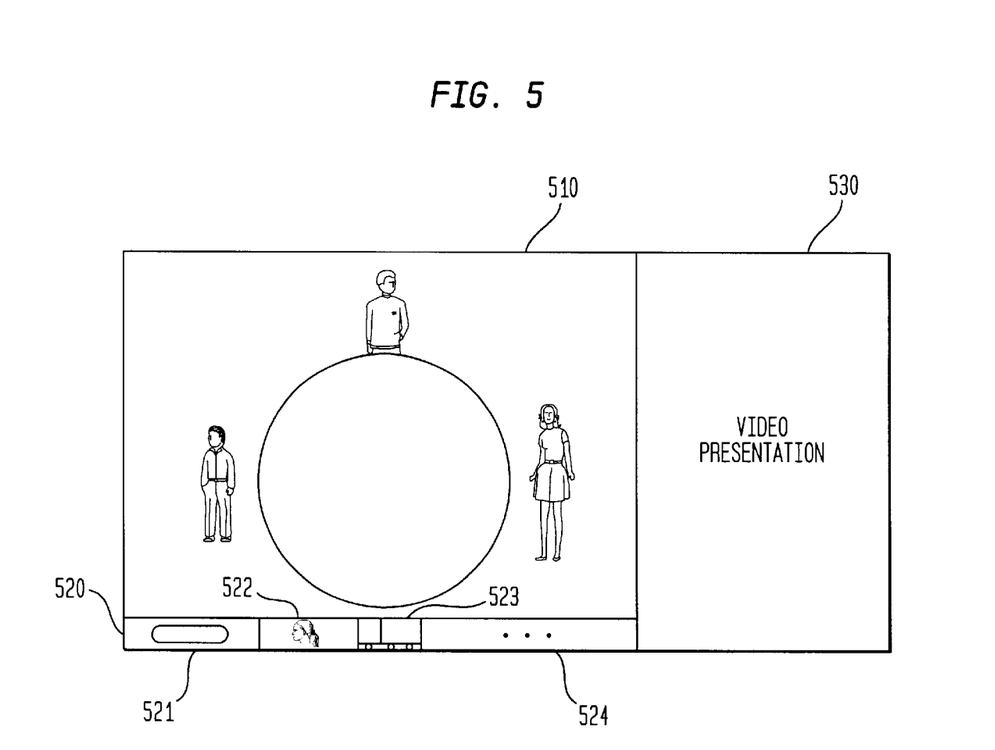
FIG. 5 is a typical video display seen by a conferee participant of a conference accomplished according to the principles of the present invention including, for example, a virtual conference portion, a visual presentation portion and an icon portion for actuating pop-up interactive windows.

There may be up to N conferees of a virtual conference where N is a number larger than two, such as up to eight conferees, that may visually and aurally communicate with one another. Only four such conferees are shown in FIG. 1. For the four conferees of FIG. 1, conferee 100 might see an image portion 510 such as is shown in FIG. 5 where three other participants are seated around an actual or simulated round conference table. The round conference table is a "type" of conference context selected by the conferee including a conference location and type. FIG. 5 shows a round conference setting with conferees seated around a conference table which may be a simulated round conference table. Other conference locations and types may be input and selected for display by a conferee. The conference participant 100 at their terminal 101 may or may not see their own image among the other conferee images of a conference image portion 510 depending on his choice.

According to the present invention, a conferee participant may select a context for a virtual conference, the context including location, type, and purpose, as will further be described herein. The conferee may do so by appropriate known data input which may include keyboard, mouse input, voice activated actuation and other known data entry devices. In a preferred embodiment and referring to FIG. 5, a conferee may click with a mouse button on conference context icon 521 of icon screen portion 520 actuating a pop-up screen. By clicking within the pop-up interactive screen (not shown), the conferee may initiate a conference, update their preferences or input changes in real time during the conference as desired.

In a similar manner, the conferee may click on personal data icon 522 and pull up another pop-up interactive window. By clicking within this window, the conferee may change personal indicia about himself in real-time, and signal, for example, the existence of a visual media presentation for showing to other conferees. Also, the conferee may click on icon 523 for selecting screen layout, viewing choices and recording their choices. Thus, any conferee may establish conference set-up parameters regarding themselves and the context of the conference in real time as will be described further in connection with a discussion of FIGS. 4, 5, 6 and 7.

Referring to FIG. 5, and within conference image 510, a 3D like simulated conference arrangement may be shown where the table is graphically or photographically derived and each conferee may be a graphical or photographic image of a talking head derived from a single photograph of the conferee. Each participant may see the same image of all participants at the conference or a view from that participant's perspective, excluding that participant's image.

According to one aspect of the present invention, each conferee receives a display in which each displayed conferee is represented by a live video image as if the conferee were present in a life-like conference setting. The live conferee images are overlaid in real time with a photographic image of a conference table and the table, in turn, overlaid on a 180 degree photographic image of a conference room such as the White House Oval Office, whose image has been previously stored in an archive for retrieval. The conferee will appear in their selected context, their image being superimposed in selected placement within their selected conference type and at their selected location. The conferee may choose to see or not to see themselves. If he chooses not to see himself, he will only see the other conferees as he would see if he was at a live conference. The conferee may select a conference context including 1) the conferee's personal choice of conference room location from a plurality of predetermined locations within an archive of locations, 2) a default location selected by a chairperson as is known from the prior art or 3) design and select their own conference room location.

The selected context further includes a selected type of conference from choices including a round table conference, a square table, a rectangular table, a poker table, a black-jack table, a jury table, a deposition like setting, a U shape table arrangement or any other shape or seating arrangement and table context type the user selects or designs. The context type may be 1) photographically archived as predetermined context location data may be archived, 2) may be a dealt type selected by a chairperson or 3) may be graphically generated or designed by the user and arranged within the selected location.

Also, the conferee may select a purpose for the meeting. The purpose for the meeting may be a deposition and so the purpose may define certain tools that must be available such as audio and/or video recording tools. The purpose may be training and so define different tools that must be present such as a blackboard.

In accordance with the invention, a conference context comprising location, type and purpose selected by one conference may differ from that selected by another conferee, and each conferee will receive a display of their selected context and seating arrangement. To the extent necessary, a conferee may negotiate, or arranges with another conferee or all other conferees to achieve a mutually compatible conference context but such negotiation is not required.

A conferee participant may be provided with an intelligent communication device 101. Such an intelligent communication device may be a telephone, a personal computer or other terminal 101 comprising, for example, a camera, microphone and display arrangement 101a, an audio speaker arrangement 101b which may be stereo and a network interface, for example, a modulator/demodulator or other network interface 101c. In one embodiment, the camera of the camera, microphone and display arrangement 101a may be conveniently located at the top of the display and the microphone to one side of the display. Other arrangements may be used to equivalent advantage depending on the conference application. The conferee camera may be equipped with a fish-eye lens. The camera may receive and, with the assistance of a data processor of the intelligent communications device, transmit a compressed real-time video image of a conference participant and their environment. The terminal 101 may be equipped with a computer mouse, keyboard, the data processor and memory as is well known in the art (not shown). The conferee may use computer input devices such as the computer mouse to input selections to the processor including selections of video conference context that may be different from a context selected at another intelligent communication device. The conferee may click on various choices of context location and type, other choices of pop-up windows and click in a known manner to pan, tilt, rotate and zoom within the conference context and setting or select among presentations by participants. Processor/server 170 monitors and scans the mouse or other conferee inputs for controlling the virtual conference context prior to or during the conference.

Communication link 102, which connects terminal 101 with network 150, may be any conventional linking facility known in the art such as a twisted pair, fiber optic facility, a hybrid fiber optic/coaxial facility, a satellite or radio frequency such as cellular wireless link or other link to network 150. Typically, communications link 102 may be an integrated services digital network (ISDN) link operating at data speeds less than or equal to 64 kilobits per second or an asynchronous digital subscriber line (ADSL) link at approximately one megabit per second or a high speed cable modem link. However, as technology improves, the bandwidth and data speeds may increase even to the point of meeting or exceeding one gigabit per second. Also, terminal 101 may incorporate video and/or audio signal compression and decompression circuitry and algorithms, not shown for use in transmitting audio and video over link 102. One known compression standard is proposed through the motion pictures electroncis group (MPEG); other standard compression algorithms may be suitably used to advantage as well. Terminal 101 may include decompression circuitry and algorithms (not shown) which are used upon receipt of a compressed video/audio signal to generate an uncompressed signal for display. Alternatively, compression and decompression algorithms and any other required algorithms may be downloaded to the terminal 101 from processor/server 170 prior to or during the conference.

Camera C of apparatus 101a may capture a live, real-time video image of conferee 100. Once a conferee is connected to bridge 160 via server 170 of the present invention, a video signal, preferably, a compressed digital video bit stream signal, is supplied over link 102 via network 150 to bridge 160. The signal is processed at bridge 160 according to the present invention. Unless conferee 100 chooses not to be seen, the other conference participants may elect whether or not to see conferee 100.

Central bridge 160 may be a dial-up or otherwise addressable bridge that is preferably a shared resource of the network 150. Central bridge 160 is actuated by auxiliary processor/server 170 at conference time after the special service request for a video conference is received at server 170 from a conferee 100. In one embodiment of the invention, the conference bridge 160 may be a shared resource of a conference service that conferees may access whenever they wish. As a first conferee connects to the bridge, conferee 100 connects to bridge 160 first and then conferee 110, a second conferee connects to the bridge, the conferee accepts an assigned seat or assigns themselves a seat at a conference table, for example, a round table, upon negotiations with others present at the table. The conference location and type including the table arrangement may be simulated and displayed as a virtual conference table in a virtual meeting room (FIG. 5). Conferee 3 may be conferee 120 and conferee 4 may be conferee 130. The next person to join the conference may assign themselves the next seat around the conference table, and the conference table grow in size accordingly. Also, conferees may change seats as they may mutually agree to do so.

Conference Seating Arrangement

Now the virtual conference seating arrangement and automatic composition of a video stream according to one aspect of the present invention will be described. The conferees define a conference seating arrangement by assigning themselves to positions at the conference. Furthermore, the conferees define the virtual conference they see by selecting a conference context including a conference location, type and purpose among other variables.

Figure 2:
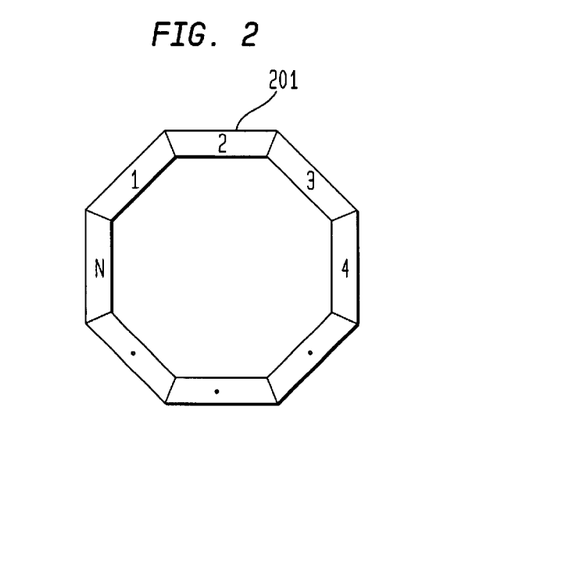
FIG. 2 provides a representation of a band of video signals comprising signals for N conferees in accordance with the present invention which is output by the conference bridge 160 of FIG. 1.

It is assumed for the purpose of this discussion that the conference seating arrangement has been agreed upon by the participants. Continuing with an example of four conferees assigned to positions at a conference, the conference bridge may receive four separate video signals, one video signal for each conferee over respective links 102, 112, 122 and 132. In the more generic example, the N'th conferee is positioned at the foremost right of conferee N-1. Referring to FIG. 2, a single video signal is developed from N video signals at bridge 160 by video processing circuitry. The video processing circuitry operates to concatenate a single video signal comprising all N video conferee's signals in assigned sequence if a particular conferee so selects or all N-1 (excluding the particular conferee) if the conferee so selects. At each terminal 101, 111, 121, 131, either signal may be centrally processed to create a conferee view (FIG. 4) seen by a particular conferee. A view generated from the signal is displayed as conference image 520 (FIG. 5).

Video signals, no matter how formed, are composed of a series of frames representing the state of a captured image at a point in time. FIG. 2 intends to represent such a single frame signal that is the combined representation of N or N-1 conferee images, where N is 5. FIG. 2 represents a circular or round placement of conferees but the present invention is not so limited. A conference type may be selected from many choices including round, square, U-shaped, deposition-style, or any design the conferee selects. When a display for a particular conferee is generated at their terminal, the display may be generated from a signal representing all other segments of the signal but the conferee's signal. In the selected option where all N signals are formed in a band for transmission to a conferee, any number of known processes may be used to derive a conferee video signal showing N-1 conferees. One such process, for example, is to compare the conferee's signal with the received band signal comprising all conferee signals and to generate the remaining signal for display as the signals clockwise and counterclockwise (referring to FIG. 2) of the band frame. Conferee 2 will then have a viewpoint generated from position 201 of the frame. That is, conferee 1 and N will appear to their right and conferees 3 and 4 to their left. The image the conferee may see displayed on his terminal may show N-1 participants excluding himself.

An algorithm for formulating a band signal including image signal portions representing N-1 conferees at conference bridge 160 involves arranging the assigned conference seating arrangement as a concatenated band of N video signals: /1/2/3/4/5/ . . . /N/ and so on. Let a conferee C be a conferee where 1 is less than or equal to C and C is less than or equal to N. Then the conference bridge 160 creates two separate bands for combining as one band consisting of the ordered sequence of conferee signals and the final signal that is displayed is that signal, less that conferee's signal, such that:

Band 1: if C='s 1, then Band 1={ } else Band 1='s {1, . . . , C−1} and

Band 2: if C='s N, then Band 1={ } else Band 1={C+1, . . . , N}

Then, Band 1 is concatenated with band 2 producing the single band for transmission and display: /Band 2/Band 1/.

If there are five conferees, and this is Conferee C, conferee 2: Band 1=/1/ and Band 2=/3/4/5/ so that the final, single band output by the bridge 160 and finally displayed by terminal 110 is /3/4/5/1/. In this manner, conferees 3 and 4 appear to conferee 2's left and conferees 5 and 1 appear to conferee 2's right. Thus, according to one aspect of the present invention, a correct orientation for each talking head/body is formed via a real-time video signal for every conferee. A chroma key or other known video processing technique may be utilized to place the conferee video signal onto a virtual graphic or photographic background of a round, straight or other conferee table of the conferee's preference. Further, the conference table selection may be overlaid in three dimensions on a graphically generated or photographically preserved location of the conferee's choice as will be further discussed herein.

The following is an exemplary algorithm for conferee placement:

```
#include <iostream.h>
#include <stdlib.h>
void conferenceView (int 1, int numConferees)

{
    cout << endl;
    cout <<"CONFEREE" <<i<<"." <<endl;
    int b2 = 1 + 1;
    int b1 = 1;
    while (b2 <= numConferees)
        cout << "/" <<b2++;
    while (b1 <i)
        cout << "/" <<b1++;
        cout << "/" <<endl <<endl;
}
main (int argc, char **argv)
{
    int numConferees = 5:
    if(argc > 1)
        numConferees = atoi (argv[1]);
    cout << "Emulating a Round Table configuration by creating a view for each conferee" <<endl;
    cout << "There are" << numConferees << "conferees seated around a table in clockwise order." <<endl;
    for (int i=1; i <= numConferees; i++)
        conferenceView (i, numConferees);
}
```

Figure 3:
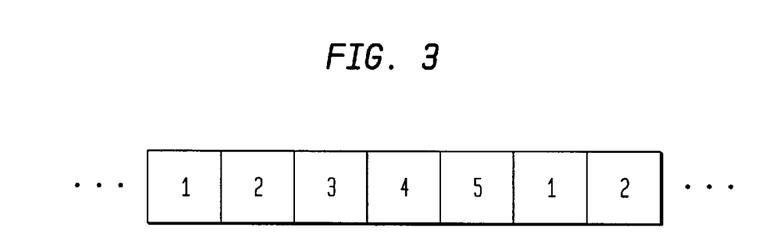
FIG. 3 provides a specific example of such a band for a five conferee (where N equals 5) video conference.

Referring to FIG. 3, there is shown an exemplary band for 5 conferees where individual frames (or fields in an interlaced system) together form a sequence of video signals. The following is the output of the above algorithm for 5 conferees:

CONFEREE 1: /2/3/4/5/ CONFEREE 2: /3/4/5/1/ CONFEREE 3: /4/5/1/2/

CONFEREE 4: /5/1/2/3/ and CONFEREE 5: /1/2/3/4/

Figure 4:
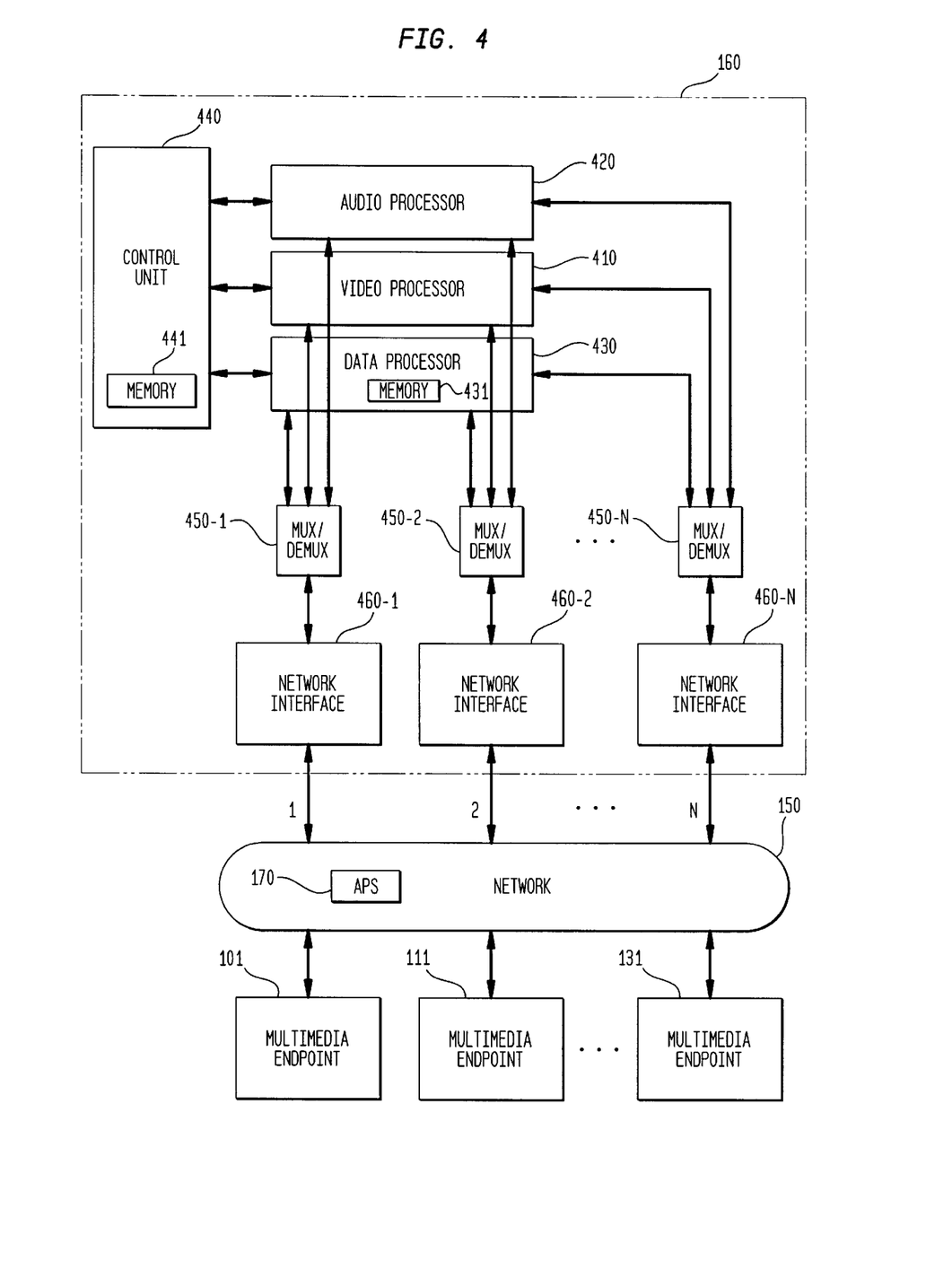
FIG. 4 is a schematic block diagram of video conference bridge apparatus of the present invention.

Now referring to FIG. 4, there is shown a block schematic diagram of a conference bridge 160 whose video processor 410 and controller 440 play the above-described algorithm or related algorithm. The conference bridge 160 appears to be shown as a bridge outside the boundaries of the network 150. In one embodiment, the conferee bridge 160 may be a bridge on the premises of a chairperson of the video conference. In an another embodiment (as suggested by FIG. 1), both the processor/server 170 and the bridge 160 are elements of network 150.

According to a first step of the algorimm, each new conferee is assigned a seat at a conference arrangement according to a negotiation, if necessary, with other participants (or a default ordering such as left to right or clockwise if no one objects). The algorithm may be stored in memory 441. As conferees are added to the conference, the output video band is concatenated to include the new conferee signal as described above and a context including location and type as will be further discussed herein may be generated at the bridge 160 or at conferee terminals 101, 111, 121 or 131. In one embodiment of the present invention, as much processing of signals as possible is accomplished at central conference bridge 160. This embodiment has the advantage that the terminal 101 may be intelligent but need not provide signal processing capability. On the other hand, in another embodiment it may be appropriate to rely on video processing capability at a terminal, for example, for decompressing video or audio and generating a signal for display or to be heard.

Video processor 410 constructs a selected context for each conferee according to conferee input and selectively overlays selected personal images in the conference type on the conference location. The personal images may have different orientation and tilt applied to a reference 3D personal image depending on the context. Resolution of personal images will vary depending on the number of viewed conferees and the context. Also, video processor 410 outputs the video image portion according to FIG. 5 in a selected manner, for example, with an icon portion and a presentation portion to form a subdivided screen as the user has selected. If the user has selected an icon, then, the video processor outputs a bitstream for generating a screen display as per FIG. 5, for example, with pop-up interactive windows (not shown).

Audio processor 420 is provided for receiving a stereo or 3D audio signal from each conference participant and in a known manner generate a 3D audio signal for playing at each speaker arrangement 101b, 111b, and so on at respective terminals as appropriate. In a similar manner as with video processing, the left and right stereo audio channels may be appropriately attenuated according to a selected conferee arrangement within the context and location and distributed to each terminal by audio processor 420 as desired.

Data processor 430 is provided for receiving a data signal from each conferee participant and in a known manner generates a data signal (for example, representing graphics, photographic, or other archived or real-time images or the like that a conference participant wants to show the others) for display and is so distributed to each participant as required. Data processor 430 may have an associated memory 431. Data processor 430 operates for each conferee responsive to inputs from users to output data for mixing with video and icon data.

There may be N ports to network 150 each having a mux/demux 450-1, 450-2 . . . 450-N for multiplexing/demultiplexing signals from/to the audio, video and data processors. These in turn are is output/input from/to the network 150 via network interfaces 460-1, 460-2 . . . 460-N which may be modulator/demodulators known in the art.

Conference Initiation

Now the initiation and real-time control of a video conference in accordance with the invention will be described in greater detail with reference to FIGS. 1, 4, 5, 6 and 7. Referring first to FIG. 5, a conferee 100 will be presented by processor/server 170 with a set-up screen that may initially bear some resemblance to the depicted screen. The set-up screen may not initially show an actual virtual conference room portion 510 or a video presentation portion 530' but will always contain a pop-up option icon portion 520 for selecting conference options. Icon portion 520 of FIG. 5 represents a capability to pop-up interactive windows in real time for personal control of a conference setting and screen lay-out. A conferee from their terminal in a preferred embodiment of the present invention may click on icons 521, 522, 523 and so on to view pop-up windows to interact with the conference system in real time. These are shown at the bottom of a screen but, of course, this is but one embodiment. The icons may appear in any practical arrangement and may be aligned along a side of the screen or the top or grouped in a screen area. The set-up screen will be downloaded to the user upon initiation of a connection with the user to processor/server 170 as discussed below.

There may initially be no special software other than dialing software resident in the conferee's terminal 101. The user may request the downloading to the terminal of any required software prior to or during the conference. Also, from the defined context, the user may automatically receive certain software whether they specifically requested the software or not.

With their mouse, the conferee will typically be able to initiate a conference by clicking, for example, on a dialing icon (not shown) for out dialing an address or outputting an Internet address. The requested or automatic downloading (if the conferee has already selected a context) to the user of special application software may be then initiated and/or the software shared from processor/server 170. The out-dialed address signifies a connection through the network 150 (telecommunications, Internet or other network) to a telecommunications processor or server 170. Once connected to the processor/server 170, a set-up pop-up screen (not shown) may be generated by the processor server 170 for presentation to the conferee to permit the ability to input the identity of other conferee participants, a time for a conference, a preferred context (from context icon 521), personal information (from context icon 522), screen layout (icon 523) and the like which may be stored and updated in real time at processor/server 170. As the conferee interacts with the down-loaded set-up screen, the screen will become more similar to the screen of FIG. 5.

Figure 6A:
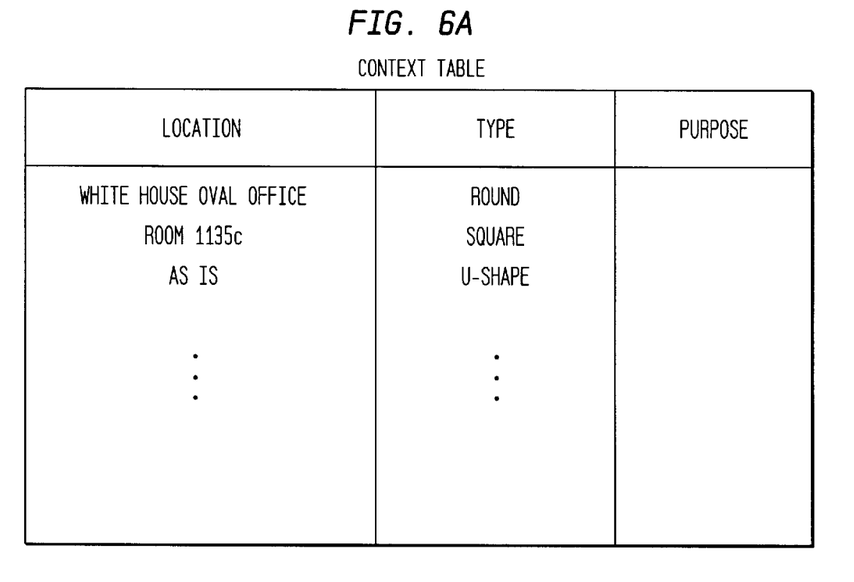
FIG. 6A is an example of a context table, for example, stored in memory of processor/server 170 or memory 441 of controller 440.

Referring to FIG. 6A, there is shown an example of a context table of memory of processor/server 170 or conference bridge 160. A conferee may select a context including location, type and purpose from such a context table or establish a new design for storage therein. For example, the conference location may be the White House oval office (from a 180 degree photographic image thereof or other photograph) or other fantasy location, a conference room on premises such as room 1135C, a conference room of the conferee's design or any other location for the conference. A fantasy or designed location may be uploaded to the processor/server by the conferee or a drawing or design program of the processor/server 170 used to permit the conferee to design a location or to design a type (as will be suggested below).

The context table stored in memory of processor/server 170 also contains a type field. A type of conference arrangement may be also selected or designed in a similar manner to the location field.

The conferee may choose a round table, a square table, a U-shaped table arrangement or other designed arrangement. Also, a purpose field of the context table is shown. The purpose field may be selected and indicated such as an arbitration proceeding, a real estate closing, a business discussion or other purpose. Once selected, the purpose field may signal the processor/server the type of resources that may be called upon for the virtual video conference. Yet other fields of a context table of processor/server memory may come to mind of one of ordinary skill in the art. The type of conference table arrangement may be overlaid within the selected location and the selected arrangement viewed in screen portion 510 and updated in real time. A user may pan, tilt and zoom within a 180 degree image as is known in the art and redesign the type within the location as desired.

Also, the context purpose may be displayed (or not) as the conferee wishes within a selected screen layout selected via icon 523. The selection of a purpose may signal the need for specific resources such as a blackboard or video and audio recording equipment.

The first conferee may attempt to set the conference room arrangement as "permanent" or "flexible" in memory of processor/server 160. If the conferee attempts to mark the arrangement "permanent," then, the conferee may be assuring a position of being a chairperson of the conference and wanting to control the conference. The present invention permits flexibility so that conferees may pick their own conference arrangement as they wish. If the conference is "flexible," it is clear that any conferee can select any conference context they wish.

Figure 6B:
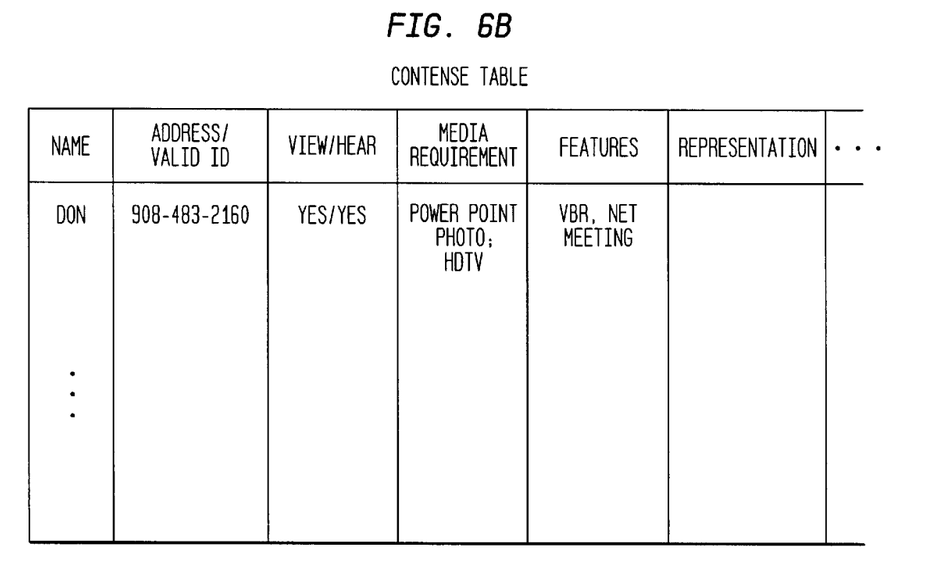
FIG. 6B is an example of a conferee table, for example, stored in memory of processor/server 170 or memory 441 of controller 440.

Referring to FIG. 6B, there is shown a conferee personal data table where a conferee may establish parameters and fields personal to themselves as conferees. The conferee personal data table may be selectively accessed via personal icon 522 (FIG. 5). Fields of the conferee table may include and are not limited to name, address or valid identification (security for the conference is not an aspect of the present invention), does the conferee wish to be viewed and/or heard (camera on/off, microphone on/off), media requirements, features of the conferee's terminal and communication environment and selected representation (live image or selected image such as photographic image of themselves). Yet other fields of a personal table may come to mind of one of ordinary skill in the art. The personal view and stored images of identified conferees may be overlaid during set-up of the virtual conference.

Once a conferee has set-up the conference, the processor/server will grant the conference a conference identity. Also, once the conferee approves and authorizes the conference, the conference telephone number or other address, identity and time will be transmitted to all participants via the Internet or other communications network 150.

Thus, it has been explained how a first conference participant may input set-up data for a conference to be held in the future. Following initial set-up, a second conferee may then dial up the same processor/server and identify the conference. The second conferee may view the prospective arrangement in a view screen such as represented by FIG. 5. Having viewed the virtual conference setting, the second conferee may choose a different conference location, type, purpose or other parameter. The second conferee may also change their personal viewing parameters or requirements stored in a personal table such as FIG. 6B. Significant changes such as meeting location choice, type or purpose may be signaled to the first conferee via an Internet or other transmitted alert if the is first conferee so requests during set-up. Also, the second conferee may indicate their selection as "permanent" or "flexible." If "flexible, then, any other conference participant may be permitted to select the second conferee's choice of context or design their own. Again, the present invention permits flexibility prior to and during a conference.

Conference Operation

It has already been described how an individual conference view 510 may be established in real time showing conferees in the same order as all others would see them. This is but one aspect of the present invention. At conference initiation and during conference operation as described herein, the processor/server 170 of the present invention monitors for conferee input activity on the line and responds accordingly. For example, the screen layout icon 523 is used to subdivide the screen of FIG. 5 as a participant wishes to selectively view or not view portions of the conference as will be further described herein. During conference initiation, the screen lay-out selections may be considered a default selection to which changes may be implemented in real-time during conference operation or prior to a conference by other conferees.

At the time of a conference, the processor/server 170 establishes communication with all identified participants and actuates a conference bridge 160 resource, in one embodiment, located at the premises of a user, or in another embodiment, located as a shared network resource. The processor/server 170 having initiated a call or communication to each conference participant through network 150 preferably communicates with all other elements in accordance with FIG. 7.

Once the network connections of FIG. 4 are established, the connections are verified by requesting a conferee response. The response need not be verbal but may simply be a click of a mouse or actuation of the key of a keypad in response to a query.

Presumably, the first conferee initiates the virtual conference once the connections are established. Unbeknownst to the participants, the processor/controller 170 polls/tests the several terminals to determine connection characteristics. To the extent possible, the connection characteristics such as variable bit rate, continuous bit rate (and what maximum bit rate), ADSL, cable modem, etc. are determined and a table formed in memory associated with the conferee personal table of FIG. 6B.

Just as before, a conference participant may call up an interactive pop-up window during the conference and change their context and personal data to signal new requirements or context changes. The processor/server 170 also may monitor for real-time controls of their view of the conference such as pan, tilt, rotate and zoom inputs. The processor/server 170 monitors for these signals, determines if the resources and the like can be performed and does so to the extent possible in comparison with the determined connection characteristics. In this manner, a conference participant may signal the availability of a continuous bit rate audio/video presentation and the processor/server determine if the presentation can be received and distributed and to whom. The processor/server can report the results of the comparison in real time to the requesting conferee.

One conferee participant may not have the resources, for example, to receive a continuous bit rate performance of a audio/video presentation. Alternatively, there may be so much activity at the virtual conference that a conferee may selectively choose not to view a portion of the conference. In such instances or automatically, the conferee may request the processor/server to save those portions of the conference using their personal control icon 522 and related pop-up screens or windows. In the automatic mode, the processor-server automatically recognizes the inability of the conferee to witness or listen to certain portions of the virtual conference and preserves a record of all aspects of the conference personal to the conferee. In a known technique referred to by others in the art as "catch-up", a conferee just joining a conference may receive an audible summary provided in compressed format with silence gaps in speech eliminated to some extent and speech played at a slightly higher rate. Also, there may be an instant replay request received by a conferee such that a predetermined period of time of a portion of the conference may be preserved in memory for instant replay if a conferee selects. The instant replay memory may be automatically erasable after a predetermined period of time lapses.

Figure 7A:
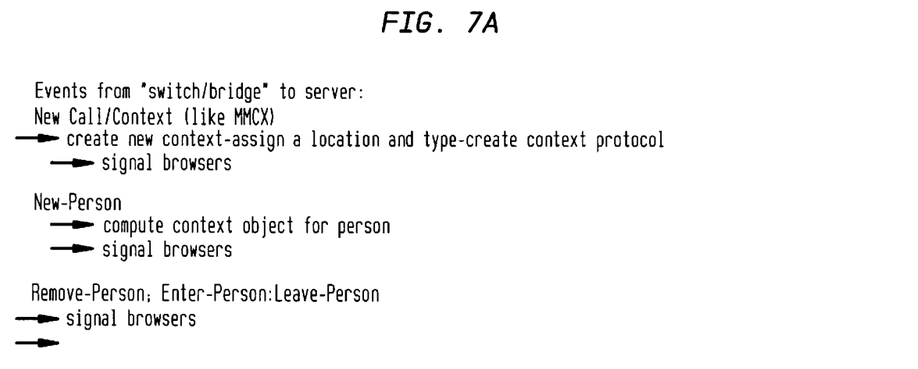
FIGS. 7A through 7D define events occurring at set-up and during the conference from the perspective of the switch/bridge to server communications (FIG. 7A), from the server to the switch/bridge FIG. 7B), from the server to a browser (FIG. 7C), and events in the signal browser (FIG. 7D).

Referring to FIG. 7A, there are identified a number of events from the switch bridge 160 to the processor/server 170. The first is the new call and conference context. A context protocol is created depending on the connection characteristics for input of context/call data. The signal browsers are used for the purpose of monitoring signals passing via the server between the conferee terminal and the conference bridge.

The new person problem relates to the addition of a new problem to a conference. The personal conferee table of FIG. 6B is required and that person should be able to pick their context. A default context object is computed for the new person and a modified one constructed in real time based on new person inputs again via the signal browsers.

As a person removes themselves from the conference, enters or leaves the person signals the same via their personal table of FIG. 6B in the case of temporary departure or, in the event of removal, by hanging up or otherwise terminating the connection to the processor/server. A signal browser or other monitor are used to determine these events.

Figure 7B:
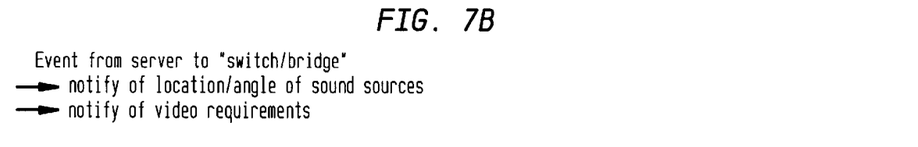

Referring to FIG. 7B, there are described some events occurring as between the server and the conference bridge. As the context changes for a given conferee, so does their audio and video signal generation. The conference bridge must adapt to transmit to each participant their personal view of the view conference. For stereo sound reception, the server computes and notifies the bridge the location/angle of sound sources and moreover, notifies of video requirements, for example, from monitoring personal window icon 523 selections.

Figure 7C:
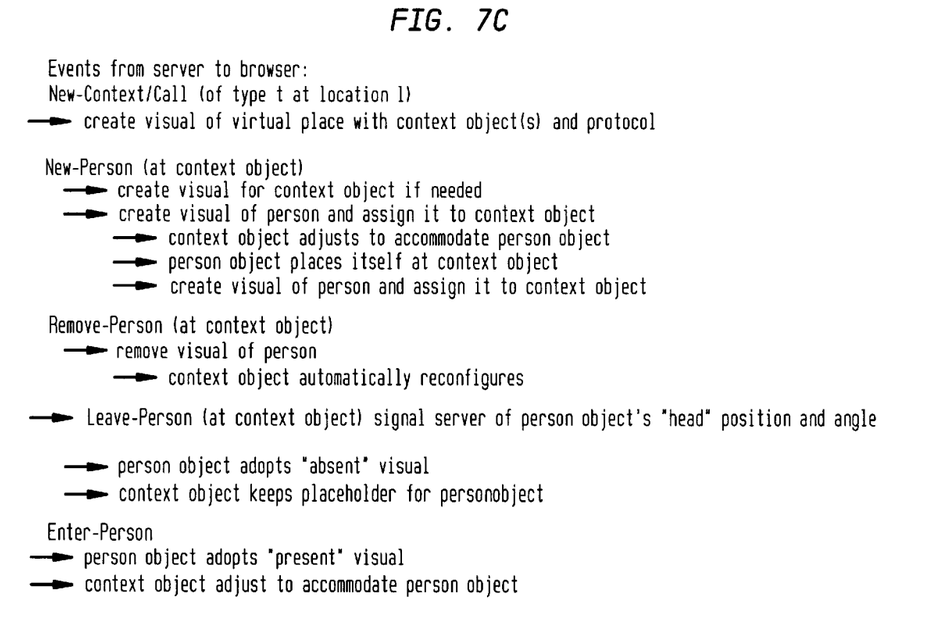

Referring to FIG. 7C, there are described some of the events as between the server and browser. The first of these is the new context/call. Note that there may be a minimum of as many as t times l different contexts to choose from. Moreover, the conferee may always define new contexts including different locations and types. Each participant makes their own selection and an image is created of a virtual conference space with the context objects and protocol.

Now the personal table is referred to. A new person (at the context object) is created. The processor/server creates a visual for a context object that becomes the conference setting according to the personal preferences of the conferee. Then a visual is created of the person depending on their preferences for live or photographic image representation. The personal image is overlaid and placed at the selected context. If a conference is in session, the context object (the conference table) may need to adjust in size to fit the new person or the assigned positions may have to be adjusted around the selected virtual conference type without resizing.

In a remove person situation, the opposite occurs. The conference context may adjust to the size of a smaller conference context and, in particular conference type as the person is removed. The person may be removed and the conference table diminishes in size. Alternatively, the remaining conferees may be repositioned around the conference table (type) without resizing the type.

In a leave person event, the person object is absent but the conference context stays the same size. A place is left at the table. The opposite occurs in an enter person event where the person that left returns and retakes their place in the selected context of each conferee.

Figure 7D:
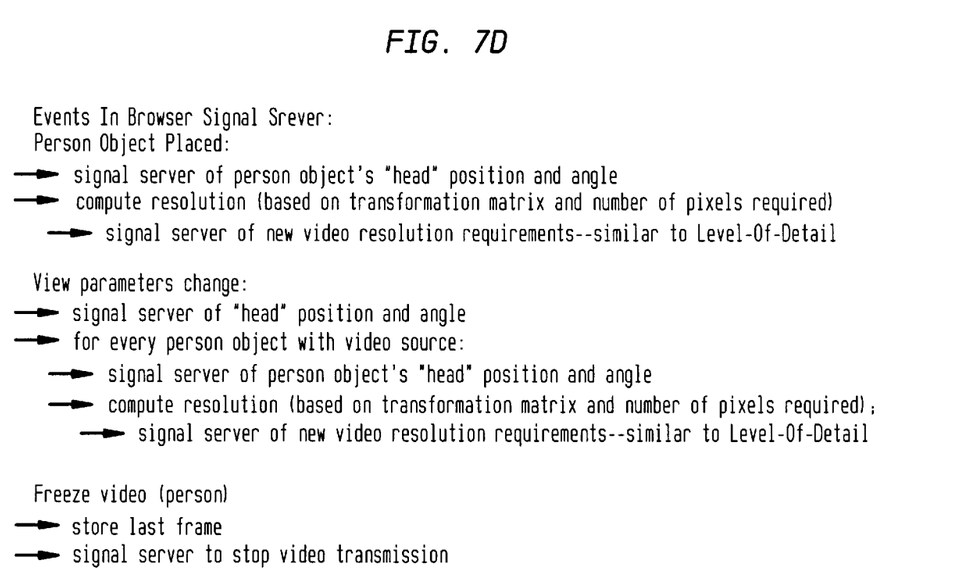

FIG. 7D relates to events in the browser signal server. The events include person object placement, changing viewing parameters and freezing a person's video. To place a person object, the browser signals the server of the person object's head position and angle. These will vary depending on the selected context and placement of the person in the context. The resolution is computed based on a transformation matrix and the number of pixels required for the person object data. The browser signals the server of new video resolution requirements as personal events change.

A change in viewing parameters occurs upon certain events occurring. The server is signaled of the head position and angle as the event occurs (such as a conferee removal or two participants changing places at a table). An algorithm for conducting changes when such events occur includes: for every person object with a video source (live camera), signal the server of the person object's "head" position and angle and compute the resolution as before (based on the transformation matrix and the number of pixels required). To do so, the browser signals the server of the new video resolution requirements.

Finally, there will be times when the person video is to be frozen (there is no animation of the head). In this case, the last frame is simply stored with the person and the browser signals the server to stop video transmission.

Other features from known systems may be applied to provide demonstrative opportunities for sharing resources, to determine who is controlling a particular resource or tool at a particular time and the like. As suggested herein, the pop-up interactive windows may be used to a number of purposes including but not limited to actuating the storage for subsequent replay of certain portions of a virtual conference that the conferee is unable to or chooses not to view in real time.

All articles and all U.S. Patents referred to herein should be deemed to be incorporated by reference as to their entire contents.

While other embodiments of video processing apparatus and methodology to support a video conference may come to mind of those of ordinary skill in the present arts from studying the present specification and drawings, all such embodiments should be deemed to be incorporated within the scope of the following claims which should only be considered limited by their scope.

What is claimed is:

1. Intelligent terminal apparatus for providing real-time live image video conference services comprising:

a display arrangement;

an audio speaker arrangement;

a data input device;

a controller; and a network interface;

the controller of said intelligent terminal apparatus, responsive to actuation of said data input device for receiving input selection data of a virtual conference context and outputting to said display arrangement a video conference image according to said selected virtual conference context, said virtual conference context capable of being a different context than that input at another intelligent terminal apparatus in a video conference with said intelligent terminal apparatus.

2. The intelligent terminal apparatus as recited in claim 1 wherein said display arrangement includes a display having three screen portions, a first screen portion for displaying a video conference according to said selected virtual conference context, a second screen portion for displaying a video presentation of a video conferee and a third screen portion for displaying a plurality of icons, one of said icons for actuating the display of another screen.

3. The Intelligent terminal apparatus as recited in claim 2, wherein said display arrangement further includes a camera equipped with a fish-eye lens and said data input device receives input selections of pan, tilt, and zoom for manipulating a conference view of said selected virtual conference context displayed in said first screen portion according to said input selections of pan, tilt and zoom.

4. The intelligent terminal apparatus as recited in claim 2 wherein said display arrangement further comprises a microphone for obtaining conferee audio input for mixing with other conferee audio input in stereo according to conferee position within said selected virtual conference context.

5. Apparatus for supporting a video conference comprising:
   a conference controller for assigning a position to a video conferee in a virtual conference context, said virtual conference context comprising a conference location and conference type;
   a signal developer for developing a real-time video signal portion for each conferee depending on the assigned position of the conferee; and
   a signal transmitter, responsive to inputs of a first conferee, for transmitting a first video signal representing a first virtual conference context to a first conferee and, responsive to inputs of a second conferee, for transmitting a second video signal representing a second virtual conference context to the second conferee, said second virtual conference context being different from said first context and including an image of said first conferee.

6. Apparatus as recited in claim 5 wherein said video said video signal developer comprises a video signal processor and memory for storing virtual conference context data, said video signal developer developing a video signal comprising a conferee portion and a context portion, said portions being relative to a number of conferees input by said first conferee.

7. Apparatus as recited in claim 5 further comprising an audio signal processor for providing a sound signal comprising left and right signal portions corresponding to said developed video signal.

8. Apparatus as recited in claim 6 wherein said video signal processor outputs a signal including a conferee portion representing images of all conferees where the number of all conferees is N and N is greater than 2.

9. Apparatus as recited in claim 5 wherein said apparatus comprises a conference bridge and terminal apparatus and said terminal apparatus comprises a signal generator for generating a video signal comprising image signal portions representing each of N-1 conferees for display.

10. Apparatus as recited in claim 6 wherein said video signal processor outputs a conferee signal portion comprising images of all conferees but one, said one image representing an image of the first conferee to which said video signal is transmitted.

11. Apparatus as recited in claim 5 wherein said apparatus comprises a conference server, a conference bridge and a plurality of intelligent terminal devices.

12. Apparatus as recited in claim 11 wherein each said intelligent terminal device comprises:
   a camera, microphone and display arrangement;
   an audio speaker arrangement;
   a data input device; and
   a network interface;
   the intelligent terminal apparatus, responsive to actuation of said data input device for receiving input selection data of virtual conference context, said context capable of being a different virtual conference context than that input at another intelligent terminal apparatus.

13. Apparatus for supporting a real-time video conference comprising:
   conference controller means for assigning a position to a video conferee in a virtual conference context, said virtual conference context comprising a conference location and conference type;
   signal development means for developing a video signal portion for each conferee depending on the assigned position of the conferee; and
   signal transmitting means, responsive to inputs of a first conferee, for transmitting a first video signal for display representing a first virtual conference context to a first conferee, such that a second video signal is transmitted by another signal transmitting means representing a second virtual conference context to a second conferee, said second virtual conference context being different from said first virtual conference context and including an image of said first conferee.

14. Apparatus as recited in claim 13 further comprising a memory means for storing virtual conference context data, said video signal development means developing video signal comprising a conferee portion and a virtual conference context portion, said portions being relative to a number of conferees input by said first conferee.

15. Video conferencing apparatus for providing a real-time live image of conferees of a video conference which comprises a video processor for (i) receiving a plurality of video signals of each conferee, (ii) receiving input signals from each of two conferees representing a different selected video conference context, (iii) assigning a position to a conferee within a selected virtual conference context and (iv) further outputting a video signal representing all conferees according to the assigned positions within the selected virtual conference context.

16. Video conferencing apparatus for providing a real-time live image of conferees of a video conference as recited in claim 15 further comprising an audio processor for receiving a plurality of audio signals of each conferee and generating a stereo audio signal for a conferee according to the assigned position of the conferee that is different from the stereo audio signal generated for another conferee.

17. Video conferencing apparatus as recited in claim 15 wherein said video processing is distributed between a central conference bridge and a plurality of conferee terminals.

18. Video conferencing apparatus as recited in claim 15 wherein said video processing is provided at a central conference bridge.

19. A method of conferencing a plurality of video terminals comprising the steps of
   receiving a real-time live video signal from each of said plurality of video terminals;
   receiving virtual conference context data from each of said plurality of video terminals, said virtual conference context data representing a selected location for a conference and type of conference;
   assigning a position in a video conference to each video terminal;

developing a video signal for a video terminal depending on the assigned position; and transmitting a first video signal for display at a first video terminal, said video signal representing a different virtual conference context than a virtual conference context represented by a video signal transmitted for display at a second video terminal.

20. A method of conferencing a plurality of video terminals as recited in claim 19 wherein the output of a concatenation step comprises a video signal comprising all the terminals of the plurality of terminals.

21. A method of conferencing a plurality of video terminals as recited in claim 19 further comprising the step of transmitting a unique video signal to each terminal for display wherein the output of a concatenation step comprises a video signal comprising all the terminals except the terminal to which said unique signal is transmitted.

22. A method of conferencing a plurality of video terminals as recited in claim 19 further comprising the step of receiving conferee inputs for at least one of the set consisting of pan, tilt and zoom within a selected context.

23. A method as recited in claim 19 further comprising the steps of receiving an audio signal from each terminal and generating a combined audio signal for each conferee, the combined audio signal for a conferee being attenuated according to an assigned position of a conferee within a received selected context.

24. A method as recited in claim 19 further comprising the step of generating a graphic image of a location and a graphic image of a conference type and chromakeying a concatenated video signal to superimpose images for terminal conferees at said conference location and type.

25. A method as recited in claim 24 further comprising the step of displaying a chromakeyed image at said terminal such that each conferee views a displayed image comprising all other conferees except themselves.

26. A method as recited in claim 19 further comprising the step of resizing said conference location and type at a conferee terminal responsive to inputs of a conferee after said conferee joins a conference in progress.

27. A method as recited in claim 19 further comprising the steps of generating a conference location view from 180 degree location image data, overlaying a conference type selection selected from one of round table, U-shape table arrangement, square table and rectangular table and overlaying a conferee image at said selected conference type within said selected location view.

28. A method as recited in claim 19 further comprising the steps, upon a conferee departing from a conference, of selectively, responsive to conferee input, reserving said assigned position at said conference type residing said conference type or repositioning remaining conferees at said conference type.

29. A computer readable media for use with a processor of an intelligent video conference controller, said controller for receiving image signals for each conferee of a video conference and for receiving input data of a first conferee representing the first conferee's selection of a virtual conference context including a conference location and a conference type and input data of a second conferee representing the second conferee's selection of a different virtual conference context, the media for storing instructions for controlling said processor to perform the steps of:

outputting a video signal for display at a first conferee terminal representing a video conference including the conferee real-time images within the selected virtual conference context; and outputting for display a different video signal representing the video conference including the real-time conferee images within the different selected virtual conference context to said second conferee.

30. A media as recited in claim 29 for further storing instructions for controlling said processor according to the steps of generating a conference location view from 180 degree location image data, overlaying a conference type selection selected from one of round table, U-shape table arrangement, square table and rectangular table and overlaying a conferee image at said selected conference type within said selected location view.

31. A computer readable media for use with a processor of an intelligent video terminal, said controller for receiving an image signal for a conferee of a video conference and for receiving input data of said conferee representing the conferee's selection of a virtual conference context including a conference location and a conference type, the media for storing instructions for controlling said processor to perform the step of:

outputting a video signal for display at said video terminal representing a video conference including real-time conferee images within the selected virtual conference context;

said output video signal being different video signal output for display by another intelligent video terminal coupled in video conference arrangement, said different video signal representing the video conference including the conferee images within a different selected virtual conference context by another conferee.

32. A media as recited in claim 31 for further storing instructions for controlling said processor according to the steps of generating a conference location view from 180 degree location image data, overlaying a conference type selection selected from one of round table, U-shape table arrangement, square table and rectangular table and overlaying a conferee image at said selected conference type within said selected location view.

* * * * *